United States Patent
Reisch et al.

(10) Patent No.: US 6,910,989 B2
(45) Date of Patent: Jun. 28, 2005

(54) METHOD FOR INCREASING BRAKE EFFICIENCY

(75) Inventors: Bernhard Reisch, Isny (DE); Peter Schmidtner, Lindau (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/416,950

(22) PCT Filed: Nov. 14, 2001

(86) PCT No.: PCT/EP01/13176
§ 371 (c)(1),
(2), (4) Date: May 14, 2003

(87) PCT Pub. No.: WO02/40330
PCT Pub. Date: May 23, 2002

(65) Prior Publication Data
US 2004/0077461 A1 Apr. 22, 2004

(30) Foreign Application Priority Data
Nov. 17, 2000 (DE) .......................... 100 57 089

(51) Int. Cl.⁷ .............................................. F16H 59/60
(52) U.S. Cl. .......................... 477/97; 188/290; 188/293
(58) Field of Search ................................. 188/290, 293, 188/296; 478/208, 184, 97, 98, 111

(56) References Cited

U.S. PATENT DOCUMENTS

| 3,650,358 A | * | 3/1972 | Bessiere ..................... 188/296 |
| 5,700,219 A | * | 12/1997 | Ohkubo ........................ 475/47 |
| 5,762,582 A | * | 6/1998 | Friedrich et al. ........... 477/208 |
| 6,090,010 A | * | 7/2000 | Rose et al. .................... 477/92 |
| 6,375,597 B1 | * | 4/2002 | Popp et al. .................... 477/97 |

FOREIGN PATENT DOCUMENTS

| DE | 44 46 288 A1 | 6/1995 | ........... B60T/1/087 |
| DE | 44 46 085 A1 | 7/1995 | ........... F16H/59/54 |
| DE | 44 46 111 A1 | 7/1995 | ........... F16H/59/54 |
| DE | 297 15 289 U1 | 12/1997 | ........... B60T/10/00 |
| DE | 197 41 510 A1 | 5/1998 | ........... B60T/10/00 |
| DE | 198 48 544 C1 | 6/2000 | ........... B60T/1/087 |
| DE | 100 09 959 A1 | 8/2000 | ........... B60T/10/02 |
| DE | 197 16 919 C2 | 7/2001 | ........... B60T/10/00 |
| EP | 0 937 619 A1 | 8/1999 | ........... B60T/10/00 |

* cited by examiner

Primary Examiner—Matthew C. Graham
(74) Attorney, Agent, or Firm—Davis & Bujold, P.L.L.C.

(57) ABSTRACT

Within the framework of the method for increasing brake efficiency of a vehicle with a hydrodynamic retarder, the rotational speed of the motor is increased by command for downshifting, in such a manner, that the increased cooling fluid circulation flow, due to the higher rotational speed of the motor speed, the necessary retarder braking power is made available, whereby a downshift command is issued, if this is necessary due to the actual retarder braking power.

7 Claims, 2 Drawing Sheets

METHOD FOR INCREASING BRAKE EFFICIENCY

FIELD OF THE INVENTION

The present invention concerns a method for increasing the braking efficiency of a vehicle using a hydrodynamic retarder.

BACKGROUND OF THE INVENTION

Retarders serve as a nearly abrasion free, lasting braking means, especially for commercial vehicles and rail guided vehicles, since without abrasive wear retarders possess, for a long period, the advantage of converting braking energy into heat.

In the case of hydrodynamic retarders, the fluid flow energy of a liquid is used for braking, wherein the physical active principle corresponds to that of a hydrodynamic clutch. In accord with this, the retarder develops a rotor-stator relationship in the power fluid, the said stator being immovably affixed in a retarder housing. Upon activation of the retarder, a quantity of oil, commensurate with the desired braking power, is admitted into the rotor blade space whereby the rotor carries the oil with it. The oil reacts thereupon against the stator, giving rise to a braking action which restrains the rotor shaft.

As a result of the above principle, it is possible that a retarder will produce, at a low rotational speed, only a small braking moment.

Under normal driving conditions, the motor rotational speeds lie at a relatively low level, namely, within that rotational speed which is most favorable to the current use. Upon retarder braking, however, a greater circulation of cooling fluid is required and, to this end, a higher motor rotational speed is both desired and necessary for optimal operation.

On this account, the purpose of the present invention is to make available a method which enables, even at originally low rotational speeds, the achievement of a sufficient desired retarder braking power.

SUMMARY OF THE INVENTION

In accordance with the above, the proposal is to increase the rotational speed by means of a command for a downshift issued by the retarder, in such a manner, that by means of the higher motor rotational speed, the circulating quantity of cooling fluid provides the necessary retarder braking action. By means of increasing of the rotation rate of the motor, and because of the higher gear ratio, the entire braking power response of the vehicle is increased.

In accordance with the invention, on the basis of comfort, only a downshift is carried out when such a shift is necessary because of the actual retarder braking power.

Within the framework of a variant, the entire situation is pre-analyzed and, in the case of necessity, a downshift command is released.

The determination as to whether or not a downshift is necessary, for the stepping of the actual potential for power of the retarder braking system, is made by several mutually interacting characteristic values.

The retarder presents important criterion as to the actual braking effect of the retarders, which can be determined from the actual braking moment, the actual braking power, the retarder engagement or disengagement, or the control flow.

Added thereto is the determination of further criterion of the actual driving condition, which is arrived at from the actual rotary motor speeds of the output shaft of the transmission, the wheels, the motor and the clutch, further thereto the speed of the vehicle, variations in the RPM or the speed, characteristics of the topography or the weight of the vehicle relative to the said topography are required.

In accordance with the invention, also the capability of the vehicle cooling system to meet power commands which is obtainable, for example, from the temperature in the cooling system, its change as a function of time, the pressure in the cooling fluid circuit, the current operating gear position, the current clutch stage in operation and the RPM of the water pump ust be taken into consideration for determination of a downshift.

Figure 1:
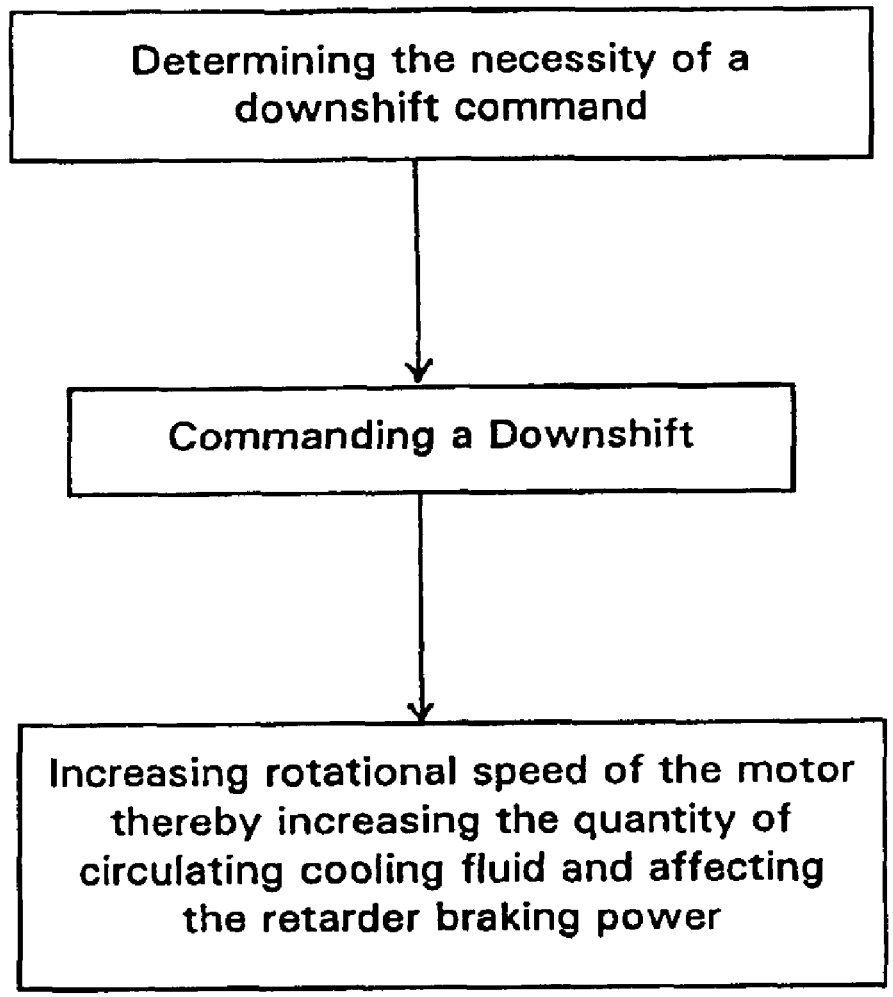
FIG. 1 is a diagrammatic flow plan of the method according to the present invention; and, FIG. 2 is a block diagram and flow diagram of a vehicle retarder braking system in which the present invention may be implemented.
Figure 2:
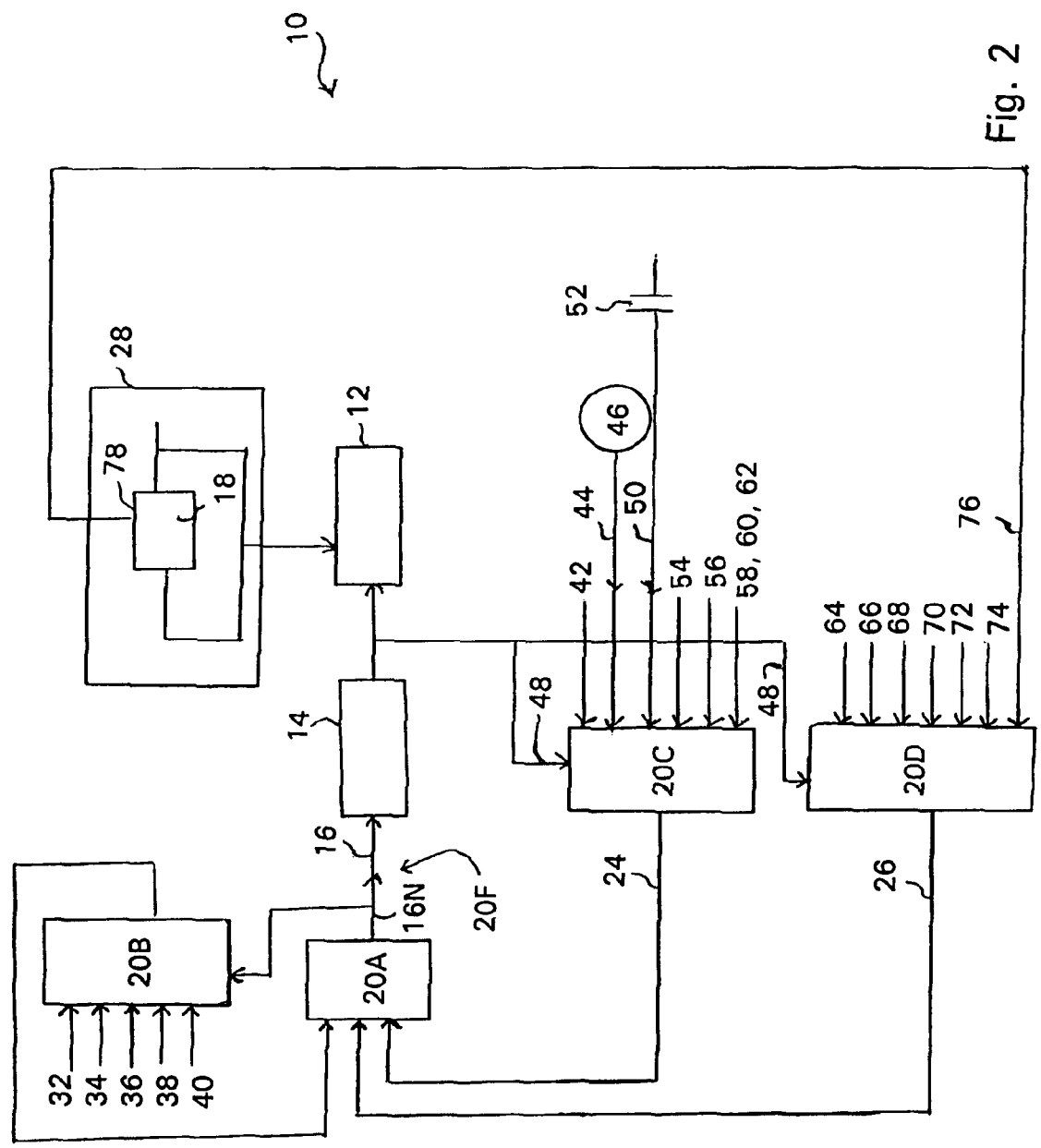

In accord with the invention, the above itemized and various characteristic quantities are given consideration by a logical correlation or with the aid of fuzzy computation, in order to recognize the necessity of the command for a downshift and to allow this to be released.

An essential advantage of the use of fuzzy computation is to be found in that different quantities are included in the final result in accord with appropriate weighting.

The downshift command is conveyed to the driver acoustically, optically or by a sense of feel. Again, for an automatic shift system, the said command can be automatically forwarded to effect the release of a shift.

In the framework of further variants, with the invented method, the necessity of a downshift command, in the presence of an overstepping or understepping of a threshold value, can be recognized. Appropriate threshold values can be established for cooling fluid temperature or gradients thereof, the rotational speed of the motor or gradients thereof, rotational speed of the drive takeoff shaft or gradients thereof.

Further, in the framework of an additional embodiment, the further development of the cooling fluid temperature and further optional values can be determined from a simulation of the cooling system. Based on the findings thereof, a down shift can be commanded.

Likewise, it is possible, under condition of automatic braking, to release a braking command, insofar as the retarder in the actual operating conditions can obtain access to the required braking power and hence the braking moment.

What is claimed is:

1. A method for increasing brake efficiency of a vehicle with a hydrodynamic retarder, in which a rotational speed of a motor is increased by command for downshifting in such a manner that due to an increased rotational speed of the motor, a quantity of available circulating cooling fluid is increase to facilitate necessary retarder braking, the method comprising the steps of:
   (20A) determining a necessity (16N) of a downshift command (16) from at least one of an actual braking efficiency (22) of the retarder (16), a driving condition (24), and a potential for cower (26) of a vehicle cooling system (28);

(20B) determining an actual braking efficiency (22) from at least one of an actual braking moment (32), a braking power (34), a retarder inlet pressure (36), a retarder outlet pressure (38) and a regulating flow (40);

(20C) determining an actual driving condition (24) from at least one of an actual transmission output shaft rotational speed (42), a rotational wheel speed (44) of a wheel (46), a motor rotational speed (48) of motor (14), a clutch rotational speed (50) of a clutch (52), a vehicle speed (54) of the vehicle (10) and also from at least one of a change in rotational speed (56), a change in the vehicle speed (58), a topography (60), and a weight (62) of the vehicle (10) with respect to the topography (60);

(20D) determining the potential for power (26) of the vehicle cooling system (28) by at least one of a temperature (64) of the cooling system (28), a change of temperature (66) of the cooling system (28), a function of time (66), the rotational speed (48) of the motor (14), a pressure (70) of the cooling circulation system (28), a shift position (72), a clutch state (74) and a rotational speed (76) of a water pump (78); and, (20E) when the necessity of a downshift command (16N) is determined, issuing the downshift command (16); and (20F) in response to the issued command (16) for downshifting, increasing a rotational speed (48) of the motor (14) in such a manner that a quantity (80) of available circulating cooling fluid (18) is increase to facilitate necessary retarder (12) braking.

2. The method according to claim 1, further comprising the step of making the downshift command known to a driver by one of an acoustic signal, an optical signal and by a tactile signal.

3. The method according to claim 1, further comprising the step of automatically forwarding the downshift command to one of an automatic shifting system and automated shifting system for the release of the shift action.

4. A method for increasing brake efficiency of a vehicle with a hydrodynamic retarder, in which a rotational speed of a motor is increased by command for downshifting in such a manner that due to an increased rotational speed of the motor, a quantity of available circulating cooling fluid is increase to facilitate necessary retarder braking, the method comprising the steps of;

determining a need for a downshift from at least one of an actual braking efficiency of the retarder, a driving condition, and a potential for power of a vehicle cooling system;

upon determining the need for a downshift, issuing a downshift command to increase the rotational speed of the motor and increase the quantity of available circulating cooling fluid for facilitating the necessary retarder braking.

5. The method according to claim 4, further comprising the steps of:

determining an actual braking efficiency from at least one of an actual braking moment, a braking power, a retarder inlet pressure, a retarder outlet pressure and a regulating flow;

determining an actual driving condition from at least one of an actual transmission output shaft rotational speed, a rotational wheel speed, a motor rotational speed, a clutch rotatory speed, a vehicle speed and also from at least one of a change in rotational speed, a change in the vehicle speed, a topography, and a weight of the vehicle with respect to the topography; and determining the potential for power of the vehicle cooling system by at least one of a temperature of the cooling system, a change of temperature of the cooling system, a function of time, the rotational speed of the motor, a pressure of the cooling circulation system, a shift position, a clutch state and a rotational speed of a water pump.

6. The method according to claim 4, further comprising the step of making the downshift command known to a driver by one of an acoustic signal, an optical signal and a tactile signal.

7. The method according to claim 4, further comprising the step of automatically forwarding the downshift command to one of an automatic shifting system and automated shifting system for the release of the shift action.

* * * * *